(12) United States Patent
Hu et al.

(10) Patent No.: US 11,314,414 B2
(45) Date of Patent: Apr. 26, 2022

(54) METHODS, DEVICES, AND COMPUTER PROGRAM PRODUCTS FOR STORAGE MANAGEMENT

(71) Applicant: EMC IP Holding Company LLC, Hopkinton, MA (US)

(72) Inventors: Jun Hu, Shanghai (CN); Yang Liu, Shanghai (CN)

(73) Assignee: EMC IP Holding Company LLC, Hopkinton, MA (US)

(*) Notice: Subject to any disclaimer, the term of this patent is extended or adjusted under 35 U.S.C. 154(b) by 44 days.

(21) Appl. No.: 16/883,032

(22) Filed: May 26, 2020

(65) Prior Publication Data
US 2021/0117097 A1 Apr. 22, 2021

(30) Foreign Application Priority Data
Oct. 21, 2019 (CN) .......................... 201911002704.1

(51) Int. Cl.
*G06F 3/06* (2006.01)
*G06F 13/10* (2006.01)

(52) U.S. Cl.
CPC .......... *G06F 3/0607* (2013.01); *G06F 3/0619* (2013.01); *G06F 3/0635* (2013.01); *G06F 3/0679* (2013.01); *G06F 13/102* (2013.01)

(58) Field of Classification Search
CPC .... G06F 3/0607; G06F 3/0619; G06F 3/0635; G06F 3/0679; G06F 13/102
USPC ........................................................... 710/8
See application file for complete search history.

(56) References Cited

U.S. PATENT DOCUMENTS

| | | | |
|---|---|---|---|
| 7,130,971 B2 | 10/2006 | Kitamura | |
| 8,019,849 B1 | 9/2011 | Lopilato et al. | |
| 2001/0047460 A1* | 11/2001 | Kobayashi | H04L 69/329 711/162 |
| 2004/0268038 A1* | 12/2004 | Nagasoe | G06F 3/0623 711/114 |
| 2009/0043959 A1* | 2/2009 | Yamamoto | G06F 12/0246 711/112 |
| 2012/0265956 A1* | 10/2012 | Nakamichi | G06F 3/067 711/162 |
| 2013/0007305 A1* | 1/2013 | Vikram | H04L 67/1097 710/16 |

(Continued)

*Primary Examiner* — Christopher B Shin
(74) *Attorney, Agent, or Firm* — BainwoodHuang

(57) ABSTRACT

Techniques involve: in accordance with a detection that an initiator port of a host is connected to a target port of a storage system, obtaining setup information from the host, the setup information at least comprising device identification information of the host and port identification information of the initiator port; determining a device object corresponding to the host and a port object corresponding to the initiator port, the device object being identified by the device identification information and the port object being identified by the port identification information; and associating the port object with the device object, the storage system managing access to a logical storage space of the host via the initiator port through the device object and the port object. Such techniques implement faster and more accurate automatic storage management for the host and the initiator port, improve management efficiency, and reduce the possibility of errors.

31 Claims, 5 Drawing Sheets

(56) References Cited

U.S. PATENT DOCUMENTS

| | | | |
|---|---|---|---|
| 2013/0028261 A1* | 1/2013 | Lee | G06F 15/7825 370/392 |
| 2014/0089445 A1* | 3/2014 | Suzuki | H04L 29/08549 709/212 |
| 2014/0372635 A1* | 12/2014 | Li-On | G06F 3/0635 710/16 |
| 2016/0085718 A1* | 3/2016 | Huang | H04L 29/08 709/213 |
| 2019/0065412 A1* | 2/2019 | Qiu | G06F 3/0611 |
| 2021/0037105 A1* | 2/2021 | Smith-Denny | H04L 12/4641 |

* cited by examiner

METHODS, DEVICES, AND COMPUTER PROGRAM PRODUCTS FOR STORAGE MANAGEMENT

CROSS-REFERENCE TO RELATED APPLICATION

This application claims priority to Chinese Patent Application No. CN201911002704.1, on file at the China National Intellectual Property Administration (CNIPA), having a filing date of Oct. 21, 2019, and having "METHODS, DEVICES, AND COMPUTER PROGRAM PRODUCTS FOR STORAGE MANAGEMENT" as a title, the contents and teachings of which are herein incorporated by reference in their entirety.

FIELD

Embodiments of the present disclosure relate to the field of data storage and more specifically, to methods, devices, and computer program products for storage management.

BACKGROUND

With the development of data storage technology, a storage system can provide a larger storage space and more intelligent storage management. Currently, the storage systems are designed to be simple, high-performance, and more cost-effective. Such storage systems can support next-generation storage medium and has longitudinally expandable and transversely expandable architecture, a flexible consumption model and high-level simplicity. However, with the rapid development of information technology, requirements for storage management are increasing. In a storage environment, one or more host devices may be connected to a storage system and access to (e.g., read/write) data in the storage system. In some cases, a host device may also access to the storage system through a plurality of ports. Therefore, a solution capable of further improving the performance of the storage system is needed for host devices and connections of their ports.

SUMMARY

Embodiments of the present disclosure provide an improved solution for storage management.

In a first aspect of the present disclosure, there is provided a method of storage management. The method includes: in accordance with a detection that an initiator port of a host device is connected to a target port of a storage system, obtaining setup information from the host device, the setup information at least including device identification information of the host device and port identification information of the initiator port; determining a device object corresponding to the host device and a port object corresponding to the initiator port, the device object being identified by the device identification information and the port object being identified by the port identification information; and associating the port object with the device object, the storage system managing access to a logical storage space of the host device via the initiator port through the device object and the port object.

In a second aspect of the present disclosure, there is provided a method of storage management. The method includes: detecting that an initiator port of a host device is connected to a target port of a storage system; and in accordance with the detection that the initiator port is connected to the target port, providing setup information from the host device to the storage system, the setup information at least including device identification information of the host device and port identification information of the initiator port, such that the storage system manages, based on the setup information, access to a logical storage space of the host device via the initiator port.

In a third aspect of the present disclosure, there is provided an electronic device. The electronic device includes a processor; and a memory coupled to the processor, the memory having instructions stored therein which, when executed by the processor, cause the electronic device to perform acts. The acts include: in accordance with a detection that an initiator port of a host device is connected to a target port of a storage system, obtaining setup information from the host device, the setup information at least including device identification information of the host device and port identification information of the initiator port; determining a device object corresponding to the host device and a port object corresponding to the initiator port, the device object being identified by the device identification information and the port object being identified by the port identification information; and associating the port object with the device object, the storage system managing access to a logical storage space of the host device via the initiator port through the device object and the port object.

In a fourth aspect of the present disclosure, there is provided an electronic device. The electronic device includes a processor; and a memory coupled to the processor, the memory having instructions stored therein which, when executed by the processor, cause the electronic device to perform acts. The acts include: detecting that an initiator port of a host device is connected to a target port of a storage system; and in accordance with the detection that the initiator port is connected to the target port, providing setup information from the host device to the storage system, the setup information at least including device identification information of the host device and port identification information of the initiator port, such that the storage system manages, based on the setup information, access to a logical storage space of the host device via the initiator port.

In a fifth aspect of the present disclosure, there is provided a computer program product being tangibly stored on a computer-readable medium and including computer-executable instructions which, when executed, causing a processor to perform the method according to the first aspect.

In a sixth aspect of the present disclosure, there is provided a computer program product being tangibly stored on a computer-readable medium and including computer-executable instructions which, when executed, causing a processor to perform the method according to the second aspect.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features, and advantages of example embodiments of the present disclosure will become more apparent from the following detailed description with reference to the accompanying drawings, in which the same reference symbols refer to the same elements in example embodiments of the present disclosure.

DETAILED DESCRIPTION OF EMBODIMENTS

Figure 1:
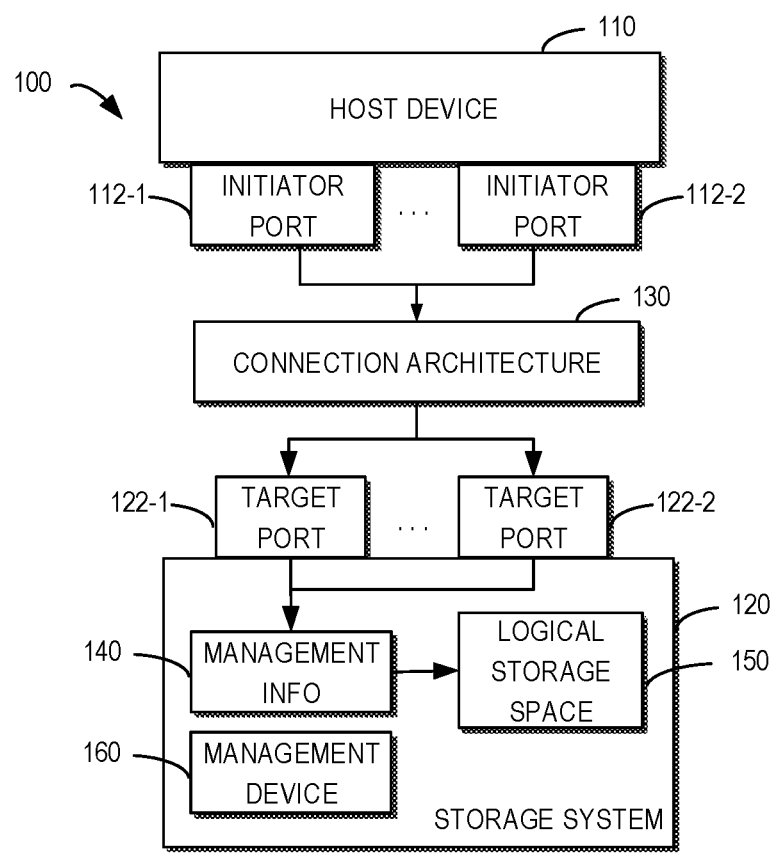
FIG. 1 illustrates a block diagram of an environment in which embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The principles of the present disclosure will be described below with reference to several example embodiments shown in the accompanying drawings. Although the preferred embodiments of the present disclosure are shown in the accompanying drawings, it would be appreciated that these embodiments are described only to enable those skilled in the art to better understand and implement the present disclosure, and not to limit the scope of the present disclosure in any way.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." Terms "a first", "a second" and others may denote different or identical objects. The following text may also contain other explicit or implicit definitions.

When the storage system is accessible by a plurality of host devices and the host devices have initiator ports connectable to target ports of the storage system (i.e., the host devices access the storage system through a plurality of paths), it is necessary to manage these host devices and their initiator ports. Especially in the case where the port connection between the host devices and the storage system conforms to a non-volatile memory express specification (NVMe), the user is usually required to manually create management objects for the host devices, and associate the host devices with the initiator ports that might be used by the host devices such that the host devices access the storage system via these initiator ports. Such a manual manner requires a lot of management labors, which is very inefficient and error-prone, especially when hundreds or thousands of host devices and their initiator ports need to be managed.

According to embodiments of the present disclosure, there is provided an improved solution for storage management. This solution can implement automatic registration of host devices and initiator ports connected thereto. Specifically, when an initiator port of a host device is connected to a target port of a storage system, the host device provides the storage system with setup information which at least indicates device identification information of the host device and port identification information of the initiator port. The storage system determines, based on the setup information, a device object corresponding to the host device and a port object corresponding to the initiator port, and associates the device object with the port object. The device object and the port object are used by the storage system to manage access to a logical storage space of the host device via the initiator port. In this way, it is possible to implement faster and more accurate automatic storage management for the host device and the initiator port, improve management efficiency, and reduce the possibility of errors.

Hereinafter, example embodiments of the present disclosure will be described in detail with reference to the accompanying figures.

FIG. 1 illustrates a block diagram of an environment 100 in which embodiments of the present disclosure can be implemented. It should be appreciated that the architecture and functions in the environment 100 are described for purpose of examples only, and do not imply any limitation on the scope of the present disclosure. Embodiments of the present disclosure can also be applied to environments with different structures and/or functions.

As shown in FIG. 1, in the environment 100, the host device 110 may access the storage system 120. For example, the host device 110 may write data to or read data from the storage system 120. The host device 110 is connected with one or more initiator ports. In the example of FIG. 1, the host device 110 is shown with a plurality of initiator ports 112-1, 112-2, and so on (hereinafter collectively or individually referred to as the initiator ports 112 for ease of description). The initiator ports 112 may also be referred to as source ports 112. The storage system 120 is connected with one or more target ports. In the example of FIG. 1, the storage system 120 is shown with a plurality of target ports 122-1, 122-2, and so on (hereinafter collectively or individually referred to as the target ports 122 for ease of description). An initiator port 112 of the host device 110 may be connected to a target port 122 of the storage system 120 such that the host device 110 may access the storage system 120 via a path between the initiator port 112 and the target port 122.

In some embodiments, the port connection between the host device 110 and the storage system 120 may follow the NVMe protocol. In this case, the initiator ports 112 may also be referred to as NVMe ports or NVMe initiator ports, and the target ports 122 may also be referred to as NVMe ports or NVMe target ports. In some embodiments, an initiator port 112 of the host device 110 is connected with a target port 122 of the storage system 120 via connection architecture 130. In some embodiments, the connection architecture 130 may be Fibre Channel (FC) architecture. In this implementation, the connection between the initiator port 112 and the target port 122 may also be referred to as an architecture-based NVMe (NVMeoF) connection or Fibre Channel NVMe (FC NVMe) connection. In other embodiments, the initiator port 112 and the target port 122 may also be connected through one or more other connection protocols (for example, the Ethernet protocol). The embodiments of the present disclosure are not limited in this regard.

The storage system 120 may be constructed based on one or more storage disks or storage nodes. The storage disk used to construct the storage system 120 may be various types of storage disks, including, but not limited to, solid state hard disks (SSDs), magnetic disks, optical disks, and the like. The storage system 120 includes management information 140 for the host device 110 and a logical storage space 150. The logical storage space 150 includes a certain amount of storage space that may be formatted into logical blocks, also referred to as a namespace. A logical block refers to the smallest addressable data unit for a read command and a write command in the storage system 120. After being formatted, the logical storage space of size n may be a set of logical blocks with logical block addresses from 0 to (n−1). The management information 140 is configured to assist the host device 110 in accessing the logical storage space 150. The management device 160 in the storage system 120 is configured to manage data access of the host device 110 to the storage system 120, manage connection and disconnection of the initiator ports 112 of the host device 110, and so on.

It should be appreciated that although only a single host device 110 is shown in FIG. 1, a plurality of host devices may access the storage system 120. In addition to the elements shown in the figure, other elements may be included in the environment 100. The number of initiator ports of the host device 110 and the target ports of the storage system 120 are also not limited.

Figure 2:
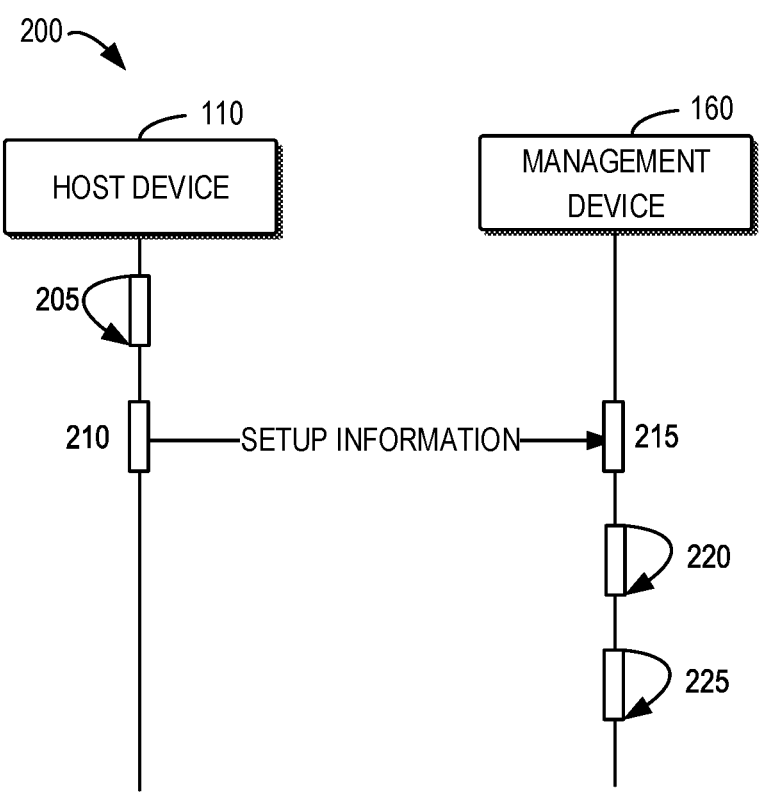
FIG. 2 illustrates a flowchart of a process of storage management in accordance with some embodiments of the present disclosure.

Detailed description will be presented below as to how the host device 110 and the management device 160 implement management of the host device 110 and its initiator ports 112. FIG. 2 illustrates a flowchart of a process 200 for storage management in accordance with some embodiments of the present disclosure. The process 200 involves the host device 110 and the management device 160 of the storage system 120.

As shown, the host device 110 detects 205 that an initiator port 112 of the host device 110 is connected to a target port 122 of the storage system 120. The connection of the initiator port 112 to the target port 122 may be considered as a registration from the initiator port 112 to the storage system 120.

If the host device 110 detects that an initiator port 112 is connected to a target port 122, the host device 110 provides 210 setup information to the storage system 120, such that the storage system 120 can implement automatic registration of the host device 110 and the initiator port 112. Different from the traditional solution in which the user needs to manually create management information of the host device and associate the newly-registered initiator port with the host device, in the embodiments of the present disclosure, it is proposed that the host device 110 actively push the setup information to the storage system 120 to complete the registration at the storage system 120.

The setup information at least includes device identification information of the host device 110 and port identification information of the currently-connected initiator port 112, such that the storage system 120 can identify the host device 110 and the currently-connected (or registered) initiator port 112. The device identification information may be any information capable of uniquely identifying the host device 110, such as a device name, a device identifier, and so on. In some embodiments, the device identification information may include an NVMe Qualified Name (NQN) of the host device 110, which may be used to uniquely describe the host device 110 for identification and authentication purposes. The NVMe NQN may be designated, for example, by identifying a controller data structure, and may remain unchanged throughout the entire life cycle of the connection of the host device 110. In some embodiments, the device identification information may additionally or alternatively include a Universally Unique Identifier (UUID) of the host device. The port identification information may be any information capable of uniquely identifying the corresponding initiator port 112 of the host device 110. In some embodiments, the port identification information of the initiator port 112 may include a transport address of the initiator port 112. For example, in the embodiment of FC-NVMe, the transport address may be in an FC-NVMe format, such as nn-0xWWNN: pn-0xWWPN, where WWNN refers to a world-wide node number and WWPN refers to a world-wide port number.

In addition to the device identification information and the port identification information, the setup information may include other information related to the initiator port 112. In some embodiments, the setup information may further include a type of the initiator port 112. For example, in an embodiment of the FC-NVMe, the setup information may indicate that the type of the initiator port 112 is a FC-NVMe type (for example, indicated by one byte of 0x01). In some embodiments, the setup information may further include related setup of the initiator port 112, for example, may indicate a capability supported by the initiator port 112. In some examples, the related setup of the initiator port 112 may indicate whether the initiator port supports asymmetric namespace access (ANA), for example, by indication of one byte of 0x01.

The host device 110 may push the setup information to the storage system 120 through a command message. The setup information may be transmitted in the transmission format followed by the command message. Table 1 below shows an example structure of the setup information.

TABLE 1

Example structure of setup information

| Byte | Corresponding information |
| --- | --- |
| 00 | Type of the initiator port |
| 01 | Related setup of the initiator port |
| 257:02 | NQN of the host device |
| 289:258 | UUID of the host device |
| 545:290 | Transport address of the initiator port |
| 639:546 | Reserved byte |

In the example of Table 1, the transport address of the initiator port 112 has a fixed size, for example, 256 bytes. These bytes may be defined as non-null. If the transfer address does not occupy a length of 256 bytes, it may be padded with spaces. It would be appreciated that FIG. 1 only shows an example structure of the setup information. In other embodiments, the setup information may have other structures. For example, various types of information included therein may have other lengths and other arrangements, or some information therein may be omitted. Embodiments of the present disclosure are not limited in this regard.

In some embodiments, if the connection between the host device 110 and the storage system 120 complies with the NVMe (e.g., NVMeoF) protocol, the setup information may have a formatted header that complies with the protocol. The formatted header together with the setup information is set as the command message to be transmitted by the host device 110, and as a management command, the command message may, for example, be referred to as an advanced subsystem setup command.

TABLE 2

Example formatted header of the setup information

| Opcode by field | | | | | |
|---|---|---|---|---|---|
| (07) Generic command | (06:02) Function | (01:00) Data Transfer | Combined Opcode | Logical storage space used? | Command name |
| 1 bit | n/a | Note (*) | EEh | No | Advanced Subsystem Setup Command |

Note: * this field indicates a data transfer direction of the command. Possible options are to transfer data as specified or transfer no data. The possible options include: 00b (namely, a bit sequence of 00)=no data transfer; 01b=from host to controller of the storage system; 10b=from controller of the storage system to host; 11b=bidirectional. For the advanced subsystem setup command carrying the setup information, the data transfer direction is from the host to the storage system, so the "data transfer" field in the header may be valued as 01b.

It would be appreciated that Table 2 only shows an example formatted header of the setup information. The setup information may be encapsulated with other header information for transfer to the storage system 120.

In some embodiments, the host device 110 may provide the setup information to the storage system 120 via in-band communication. The in-band communication mainly refers to an access channel for data input/output (I/O), which can provide a high-speed solution. Certainly, it is to be understood that according to actual requirements, the setup information may also be provided to the storage system 120 via out-of-band communication which is mainly used for management information transfer.

At the storage system 120 side, registration of each initiator port 112 of the host device 110 is mainly performed by the management device 160. Therefore, if the initiator port 112 of the host device 110 is connected to the target port 122 of the storage system 120, the management device 160 obtains 215 the above-mentioned setup information from the host device 110. The management device 160 may set the management information 140 for the host device 110 based on the obtained setup information.

The management device 160 implements management mainly by establishing virtual management objects representing the host device 110 and the initiator port 112. Specifically, after obtaining the setup information, the management device 160 determines 220 a device object corresponding to the host device 110 and a port object corresponding to the initiator port 112. The device object is identified by the device identification information, and the port object is identified by the port identification information.

Usually, for a host device 110 that is newly connected to the storage system 120 (for example, connected to the storage system 120 through the initiator port 112 for the first time), the management device 160 will create a device object corresponding to the host device 110. The management device 160 will maintain a list of created device objects. The list of created device objects include device objects that have been created for the host devices. Since each of the created device objects is identified by its device identification information, the management device 160 may loop up the list of created device objects by the device identification information in the currently received setup information.

It is assumed that the host device 110 has not been connected to the storage system 120 before, and the host device 110 is connected to the target port 122-1 of the storage system 120 for the first time via the initiator port 112-1. After receiving the setup information, the management device 160 fails to find the corresponding device object by using the device identification information of the host device 110 to perform searching. In this case, the management device 160 may generate a device object corresponding to the host device 110 and include it into the management information 140, such as the device object 310 shown in FIG. 3A. The device object may be generated, for example, according to a management model of the storage system 120, which may, for example, be an NVMe host object. The newly-generated device object 310 may be added to the list of created device objects for maintenance.

Figure 3A:
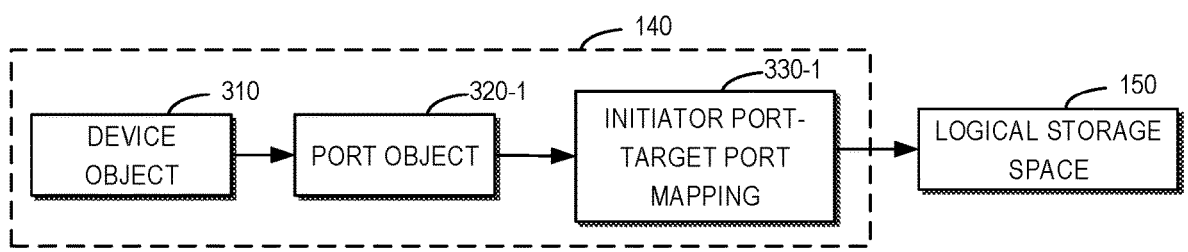
FIGS. 3A-3B illustrate example block diagrams of management information in accordance with some embodiments of the present disclosure.

In addition to determining the device object 310 corresponding to the host device 110, the management device 160 further determines the port object corresponding to the initiator port 112. The management device 160 will generate the port object corresponding to the initiator port 112 based on the port identification information of the initiator port 112, because each initiator port 112 is a new port upon connection (registration). The port object may, for example, be an NVMe initiator object. As shown in FIG. 3A, the management device 160 generates a port object 320-1 corresponding to the initiator port 112-1.

In the embodiments of the present disclosure, after determining the device object corresponding to the host device 110 and the port object of the initiator port 112, the management device 160 associates 225 the device object with the port object. For example, in the example of FIG. 3A, the management device 160 associates the device object 310 with the port object 320-1 corresponding to the initiator port 112-1 by a pointing arrow. In this way, the management device 160 may easily determine, from the management information 140, that the initiator port 112-1 is a port on the host device 110.

In some embodiments, the management object 160 further generates a mapping between the initiator port 112 and the target port 122 to which it is connected, and associates the mapping with the logical storage space 150 for the host device 110. In the example of FIG. 3A, the management object 160 generates a mapping 330-1 between the initiator port 112-1 and the target port 122-1 to which it is connected, and associates the mapping 330-1 with the logical storage space 150. In addition, in some embodiments, the management device 160 may further associate the port object of the initiator port 112 with the mapping between the initiator port 112 and the target port 122, for example, associate the port object 320-1 with the mapping 330-1 in FIG. 3A. The host device 110, the initiator port 112-1 connected thereto, the target port 122-2, and the associated logical storage space 150 may be easily managed through such management information.

Figure 3B:
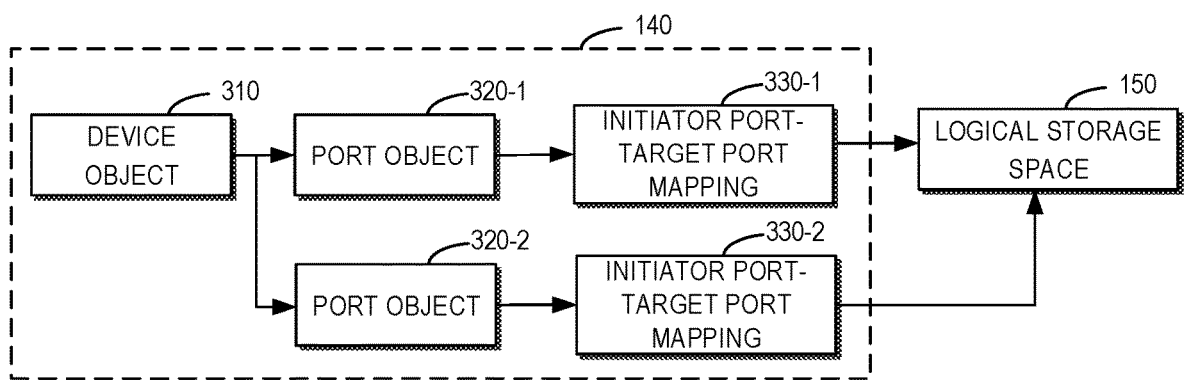

In some embodiments, if a subsequent initiator port 112 (initiator port 112-2) of the host device 110 is connected to the target port 122 (e.g., to the target port 122-2) of the storage system 120, the management device 160 may associate the newly-connected initiator port 112 with the host device 110 through the corresponding setup information sent by the host device 110. Specifically, with reference to the example of FIG. 3A, according to the setup information associated with the initiator port 112-1, the management device 160 may determine that the device object 310 corresponding to the host device 110 has been created according to the device identification information therein. Therefore, the management device 160 does not need to regenerate a new device object, but the management device 160 generates a new port object corresponding to the initiator port 112-2, such as a port object 320-2 shown in FIG. 3B, which can be identified by the port identification information of the initiator port 112-2. With the setup information, the management device 160 may further associate the port object 320-2 with the device object 310, as shown in FIG. 3B. Similarly, the management device 160 may further generate a mapping 330-2 between the initiator port 112-2 and the target port 122-2, and associate the mapping 330-2 with the logical storage space 150. In addition, the management device 160 may also associate the mapping 330-2 with the port object 320-2 that is corresponding to the initiator port 112-2. The host device 110, the initiator ports 112-1 and 112-2 connected thereto, the target ports 122-1 and 122-2, and the associated logical storage space 150 may be easily managed through such management information 140.

It may be understood that if a new host device is connected to the storage system 120 through its initiator port, the management device 160 may create a device object corresponding to this host device and a port object corresponding to respective initiator ports of the host device in a similar manner to manage access to a logical storage space of this host device via the initiator ports.

According to embodiments of the present disclosure, if an initiator port is connected to a target port, the host device pushes setup information to the storage system to trigger the storage system to establish management information for the host device and the initiator port. In this way, it is possible to implement automatic port registration management and facilitate the storage system to perform access management for the host device and initiator port.

Figure 4:
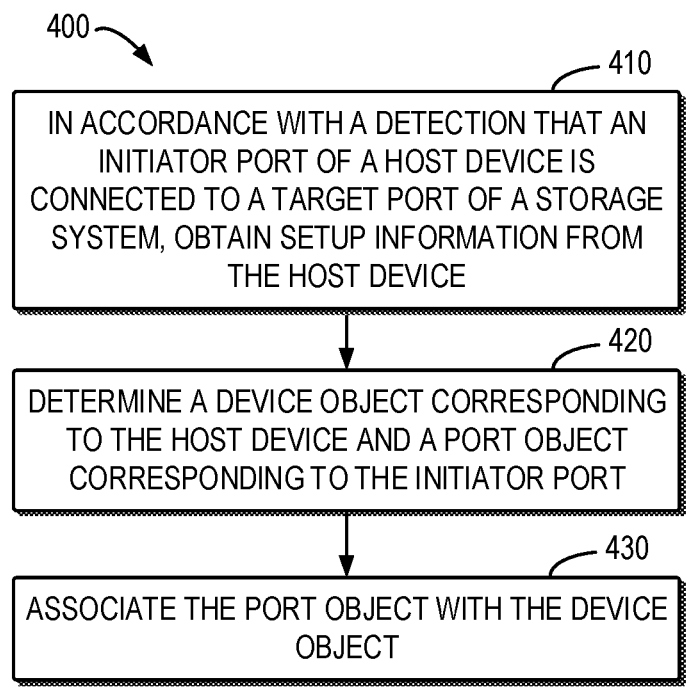
FIG. 4 illustrates a flowchart of a method of storage management on a storage system side in accordance with some embodiments of the present disclosure.

FIG. 4 illustrates a flowchart of a method 400 for storage management on a storage system side in accordance with some embodiments of the present disclosure. The method 400 may be implemented at the storage system 120, for example, by the management device 160 of the storage system 120.

At 410, the management device 160 obtains setup information from a host device in accordance with a detection that an initiator port of the host device is connected to a target port of the storage system, the setup information at least including device identification information of the host device and port identification information of the initiator port. At 420, the management device 160 determines a device object corresponding to the host device and a port object corresponding to the initiator port, the device object being identified by the device identification information and the port object being identified by the port identification information. At 430, the management device 160 associates the port object with the device object, where the storage system manages access to a logical storage space of the host device via the initiator port through the device object and the port object.

In some embodiments, a connection between the initiator port and the target port is based on a non-volatile memory express specification (NVMe).

In some embodiments, determining the device object includes: looking up a device object in a list of created device objects based on the device identification information, the list of created objects including device objects that have been created for the host device; and in accordance with a determination that the device object fails to be found, generating the device object based on the device identification information, and adding the device identification information to the list of created device objects.

In some embodiments, determining the device object further includes: in accordance with a determination that the device object is found, determining a device object created and identified by the device identification information, as the device object.

In some embodiments, the method 400 may further include generating a mapping between the initiator port and the target port; and associating the logical storage space with the mapping.

In some embodiments, the setup information further includes at least one of the following: a type of the initiator port, and related setup of the initiator port.

In some embodiments, the device identification information includes at least one of the following: an NVMe Qualified Name (NQN) of the host device, and a Universally Unique Identifier (UUID) of the host device. In some embodiments, the port identification information includes a transport address of the initiator port.

In some embodiments, obtaining the setup information includes receiving the setup information from the host device via in-band communication.

Figure 5:
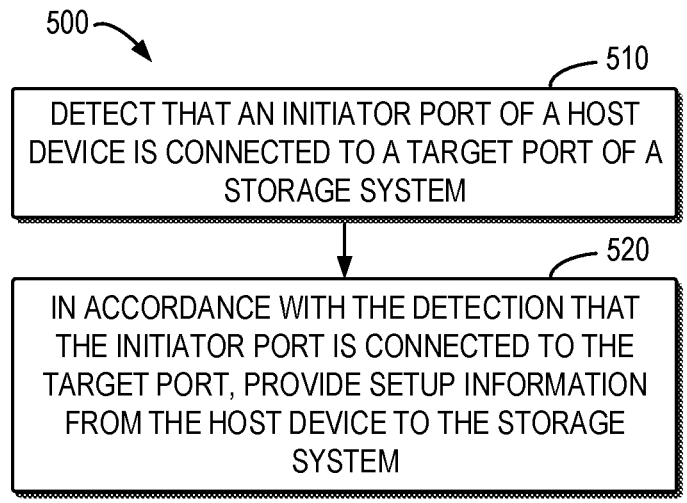
FIG. 5 illustrates a flowchart of a method of storage management on a host device side according to some other embodiments of the present disclosure.

FIG. 5 illustrates a flowchart of a method 500 for storage management on a host device side according to some other embodiments of the present disclosure. The method 500 may be implemented at the host device 110.

At 510, the host device 110 detects that an initiator port of the host device is connected to a target port of a storage system. At 520, the host device 110 provides the setup information to the storage system in accordance with the detection that the initiator port is connected to the target port. The setup information at least includes device identification information of the host device and port identification information of the initiator port, such that the storage system manages access to a logical storage space of the host device via the initiator port based on the setup information.

In some embodiments, a connection between the initiator port and the target port is based on a non-volatile memory express specification (NVMe).

In some embodiments, receiving the setup information includes providing the setup information to the storage system via in-band communication.

In some embodiments, the setup information further includes at least one of the following: a type of the initiator port, and related setup of the initiator port.

In some embodiments, the device identification information includes at least one of the following: an NVMe Qualified Name (NQN) of the host device, and a Universally Unique Identifier (UUID) of the host device. In some embodiments, the port identification information includes a transport address associated with the initiator port.

Figure 6:
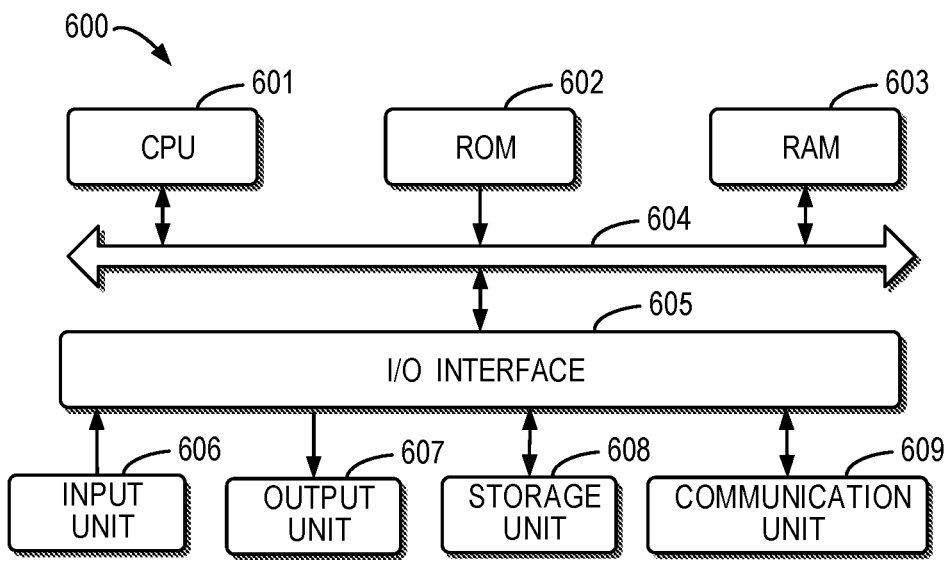
FIG. 6 illustrates a block diagram of an example device that can be used to implement embodiments of the present disclosure.

FIG. 6 illustrates a block diagram of an example device 600 that can be used to implement embodiments of the present disclosure. The device 600 may be implemented as or included in the management device 160 or the host device 110 of FIG. 1.

As shown, the device 600 includes a central processing unit (CPU) 601 which is capable of performing various processes in accordance with computer program instructions stored in a read only memory (ROM) 602 or computer program instructions loaded from a storage unit 608 to a random access memory (RAM) 603. In the RAM 603 are stored various programs and data as required by operation of the device 600. The CPU 601, the ROM 602 and the RAM 603 are connected to one another via a bus 604. An input/output (I/O) interface 606 is also connected to the bus 604.

The following components in the device 600 are connected to the I/O interface 605: an input unit 606 including a keyboard, a mouse, or the like; an output unit 607 such as various types of displays and speakers; a storage unit 608 such as a magnetic disk or optical disk; and a communication unit 609 such as a network card, a modem, a wireless communication transceiver or the like. The communication unit 609 allows the device 600 to exchange information/data with other devices via a computer network such as the Internet and/or various telecommunication networks.

The processing unit 601 performs various method and processes described above, for example the process 200, method 400, and/or method 500. For example, in some embodiments, the process 200, method 400, and/or method 500 may be implemented as a computer software program or a computer program product, which is tangibly contained in a machine-readable medium, such as a non-transitory computer-readable medium, for example the storage unit 608. In some embodiments, part or all the computer program may be loaded and/or installed on the device 600 via ROM 602 and/or communication unit 609. When the computer program is loaded in the RAM 603 and executed by CPU 601, one or more steps of the process 200, method 400, and/or method 500 described above may be executed. Alternatively, in other embodiments, the CPU 601 may be configured to perform the process 200, the method 400, and/or the method 500 in any other suitable manner (e.g., by virtue of firmware).

Those skilled in the art should understand that the above steps of the method of the present disclosure may be implemented by a general-purpose computing device, and they may be integrated on a single computing device or distributed on a network composed of a plurality of computing devices. Alternatively, they may be implemented with program code executable by the computing device, such that they may be stored in a storage device and executed by the computing device, or they may be respectively fabricated as individual integrated circuit modules, or modules or steps in them may be fabricated as individual integrated circuit modules for implementation. As such, the present disclosure is not limited to any particular combination of hardware and software.

It would be appreciated that although several means or sub-means (e.g., specialized circuitry) of the device are mentioned in the detailed description above, this division is merely by way of example and not mandatory. In fact, according to embodiments of the present disclosure, the features and functions of the two or more devices described above may be embodied in one device. Conversely, the features and functions of one device described above may be further divided and embodied by a plurality of devices.

The above are only optional embodiments of the present disclosure, and are not intended to limit the present disclosure. For those skilled in the art, the present disclosure may have various modifications and variants. Within the spirit and principle of this disclosure, any modification, equivalent replacements, and improvement made shall be included in the scope of the present disclosure.

We claim:

1. In a system having a host device connected to a storage system via a connection architecture, a method of operating the storage system to assist the host device in accessing a logical storage space provided by the storage system, the method comprising the steps, performed by the storage system, of:

in accordance with a detection that an initiator port of the host device is connected to a target port of the storage system, obtaining setup information from the host device, the setup information including at least device identification information of the host device and port identification information of the initiator port;

determining a device object corresponding to the host device, and generating a port object corresponding to the initiator port, the device object being identified by the device identification information and the port object being identified by the port identification information; and associating the port object with the device object, and subsequently using the device object and associated port object to manage access to the logical storage space by the host device via the initiator port.

2. The method of claim 1, wherein a connection between the initiator port and the target port is based on a non-volatile memory express specification (NVMe).

3. The method of claim 1, wherein determining the device object comprises:

looking up the device object in a list of created device objects based on the device identification information, the list of created device objects comprising device objects that have been created for host devices; and in accordance with a determination that the device object fails to be found, generating the device object based on the device identification information, and adding the device identification information to the list of created device objects.

4. The method of claim 3, wherein determining the device object further comprises:

in accordance with a determination that the device object is found, determining a device object created and identified by the device identification information, as the device object.

5. The method of claim 1, further comprising:

generating a mapping between the initiator port and the target port; and associating the logical storage space with the mapping.

6. The method of claim 1, wherein the setup information further comprises at least one of the following: a type of the initiator port, and related setup of the initiator port.

7. The method of claim 1, wherein the device identification information comprises at least one of the following: an NVMe Qualified Name (NQN) of the host device, and a Universally Unique Identifier (UUID) of the host device, and wherein the port identification information comprises a transport address of the initiator port.

8. The method of claim 1, wherein obtaining the setup information comprises:

receiving the setup information from the host device via in-band communication.

9. In a system having a host device connected to a storage system via a connection architecture, a method of operating the host device to enable the storage system to assist the host device in accessing a logical storage space provided by the storage system, the method comprising the steps, performed by the host device, of:
    detecting that an initiator port of the host device is connected to a target port of the storage system;
    in accordance with the detection that the initiator port is connected to the target port, providing setup information to the storage system, the setup information at least comprising device identification information of the host device and port identification information of the initiator port; and
    subsequently accessing the logical storage space via the initiator port, wherein the storage system manages, based on the setup information, the access to the logical storage space by the host device via the initiator port.

10. The method of claim 9, wherein a connection between the initiator port and the target port is based on a non-volatile memory express specification (NVMe).

11. The method of claim 9, wherein receiving the setup information comprises:
    providing the setup information to the storage system via in-band communication.

12. The method of claim 9, wherein the setup information further comprises at least one of the following: a type of the initiator port, and related setup of the initiator port.

13. The method of claim 9, wherein the device identification information comprises at least one of the following: an NVMe Qualified Name (NQN) of the host device, and a Universally Unique Identifier (UUID) of the host device, and
    wherein the port identification information comprises a transport address associated with the initiator port.

14. A storage system, comprising:
    a processor; and
    a memory coupled to the processor, the memory having instructions stored therein which, when executed by the processor, cause the storage system to perform a method to assist a host device in accessing a logical storage space provided by the storage system, the method including:
    in accordance with a detection that an initiator port of the host device is connected to a target port of the storage system, obtaining setup information from the host device, the setup information including at least device identification information of the host device and port identification information of the initiator port;
    determining a device object corresponding to the host device, and generating a port object corresponding to the initiator port, the device object being identified by the device identification information and the port object being identified by the port identification information; and
    associating the port object with the device object, and subsequently using the device object and associated port object to manage access to the logical storage space by the host device via the initiator port.

15. The storage system of claim 14, wherein a connection between the initiator port and the target port is based on a non-volatile memory express specification (NVMe).

16. The storage system of claim 14, wherein determining the device object comprises:
    looking up the device object in a list of created device objects based on the device identification information, the list of created device objects comprising device objects that have been created for host devices; and
    in accordance with a determination that the device object fails to be found,
    generating the device object based on the device identification information, and
    adding the device identification information to the list of created device objects.

17. The storage system of claim 16, wherein determining the device object further comprises:
    in accordance with a determination that the device object is found, determining a device object created and identified by the device identification information, as the device object.

18. The storage system of claim 14, wherein the method performed by the storage system further includes:
    generating a mapping between the initiator port and the target port; and
    associating the logical storage space with the mapping.

19. The storage system of claim 14, wherein the setup information further comprises at least one of the following: a type of the initiator port, and related setup of the initiator port.

20. The storage system of claim 14, wherein the device identification information comprises at least one of the following: an NVMe Qualified Name (NQN) of the host device, and a Universally Unique Identifier (UUID) of the host device, and
    wherein the port identification information comprises a transport address of the initiator port.

21. The storage system of claim 14, wherein obtaining the setup information comprises:
    receiving the setup information from the host device via in-band communication.

22. A host device, comprising:
    a processor; and
    a memory coupled to the processor, the memory having instructions stored therein which, when executed by the processor, cause the host device to perform a method enabling the storage system to assist the host device in accessing a logical storage space provided by the storage system, the method including:
    detecting that an initiator port of the host device is connected to a target port of the storage system;
    in accordance with the detection that the initiator port is connected to the target port, providing setup information to the storage system, the setup information at least comprising device identification information of the host device and port identification information of the initiator port; and
    subsequently accessing the logical storage space via the initiator port, wherein the storage system manages, based on the setup information, the access to the logical storage space by the host device via the initiator port.

23. The host device of claim 22, wherein a connection between the initiator port and the target port is based on a non-volatile memory express specification (NVMe).

24. The host device of claim 22, wherein receiving the setup information comprises:
    providing the setup information to the storage system via in-band communication.

25. The host device of claim 22, wherein the setup information further comprises at least one of the following: a type of the initiator port, and related setup of the initiator port.

26. The host device of claim 22, wherein the device identification information comprises at least one of the following: an NVMe Qualified Name (NQN) of the host device, and a Universally Unique Identifier (UUID) of the host device, and wherein the port identification information comprises a transport address associated with the initiator port.

27. A computer program product having a non-transitory computer readable medium which stores a set of instructions which, when executed by a processor of a storage system, cause the storage system to perform a method to assist a host device in accessing a logical storage space provided by the storage system, the method including:

in accordance with a detection that an initiator port of the host device is connected to a target port of the storage system, obtaining setup information from the host device, the setup information including at least device identification information of the host device and port identification information of the initiator port;

determining a device object corresponding to the host device, and generating a port object corresponding to the initiator port, the device object being identified by the device identification information and the port object being identified by the port identification information; and associating the port object with the device object, and subsequently using the device object and associated port object to manage access to the logical storage space by the host device via the initiator port.

28. A computer program product having a non-transitory computer readable medium which stores a set of instructions which, when executed by a processor of a host device, cause the host device to perform a method enabling the storage system to assist the host device in accessing a logical storage space provided by the storage system, the method including:

detecting that an initiator port of the host device is connected to a target port of the storage system; and in accordance with the detection that the initiator port is connected to the target port, providing setup information to the storage system, the setup information at least comprising device identification information of the host device and port identification information of the initiator port; and subsequently accessing the logical storage space via the initiator port, wherein the storage system manages, based on the setup information, the access to the logical storage space by the host device via the initiator port.

29. The method of claim 1, wherein using the device object and associated port object to manage access to the logical storage space includes determining, based on an identification of the initiator port and based on the device object associated with the port object, that the initiator port is a port of the host device.

30. The method of claim 1, further including, by the storage system in response to subsequent connection of a second initiator port of the host device to the target port of the storage system:

obtaining second setup information from the host device, including at least the device identification information of the host device and second port identification of the initiator port;

determining that the device object corresponding to the host device is an existing device object not needing to be generated;

generating a second port object and associating it with the existing device object, and subsequently using the device object and associated second port object to manage access to the logical storage space of by the host device via the second initiator port.

31. The method of claim 1, wherein the storage system includes a management device operative to (1) perform the obtaining, determining, generating and associating steps and to set management information in the storage system containing the device object and associated port object, and (2) use the management information in managing the access to the logical storage space of the storage system by the host device.

* * * * *